(12) United States Patent
Kennedy, Jr.

(10) Patent No.: US 7,748,100 B2
(45) Date of Patent: Jul. 6, 2010

(54) METHODS OF SECURING A PIPE (75) Inventor: Harold Kennedy, Jr., 200 Caviston Way, Cary, NC (US) 27519

(73) Assignee: Harold Kennedy, Jr., Cary, NC (US)

( * ) Notice: Subject to any disclaimer, the term of this patent is extended or adjusted under 35 U.S.C. 154(b) by 520 days.

(21) Appl. No.: 11/803,661

(22) Filed: May 15, 2007

(65) Prior Publication Data
US 2007/0241561 A1 Oct. 18, 2007

Related U.S. Application Data

(62) Division of application No. 11/178,898, filed on Jul. 11, 2005, now Pat. No. 7,484,775.

(60) Provisional application No. 60/587,565, filed on Jul. 13, 2004.

(51) Int. Cl.
*B21D 39/00* (2006.01)
*F16L 17/00* (2006.01)

(52) U.S. Cl. .......................................... 29/456; 285/337

(58) Field of Classification Search ................. 29/456, 29/525.01, 428; 285/337, 339, 342, 343, 285/4, 404, 421; 411/375.5, 372.6, 4, 5, 411/373
See application file for complete search history.

(56) References Cited

U.S. PATENT DOCUMENTS 6,739,631 B2 * 5/2004 Smith et al. .................. 285/337

* cited by examiner

*Primary Examiner*—John C Hong
(74) *Attorney, Agent, or Firm*—Myers Bigel Sibley & Sajovec, P.A.

(57) ABSTRACT

A pipe joint restraint (16) includes a pocket (74) having a fulcrum (92) a fixed distance from the centerline (26) of an annular retaining gland (22) and about which a gripping element (76) pivots to move a gripping edge (75) toward the centerline (26) so as to grip a pipe (14) engaged by the gripping element (76) in response to thrust forces on the pipe (14). The length of gripping edge (75) is selected for the material of pipe (14). Adjustable element (78) operatively connects to the gripping element (76) and fulcrum (92) to pivot with the gripping element (76). Adjustable element (78) and may be torqued to a common, predetermined torque whether the pipe (14) is metal or polymeric.

14 Claims, 5 Drawing Sheets

METHODS OF SECURING A PIPE

This application is a divisional application of U.S. patent application Ser. No. 11/178,898 filed Jul. 11, 2005 now U.S. Pat. No. 7,484,775, which claims priority to U.S. Provisional Patent Application 60/587,565, filed Jul. 13, 2004, the disclosures of which are hereby incorporated herein by reference in their entireties.

FIELD OF THE INVENTION

The present invention relates generally to pipe joint restraints for coupling the end of a pipe to another member, such as another pipe, a valve, or other similar members that are to be coupled with the pipe.

BACKGROUND OF THE INVENTION

It is often necessary to couple together the end of a pipe, such as a water pipe, to another member, such as another pipe, a valve, a fitting, or other similar pipe-like structure. In some cases, the ends of two adjacent pipes may be flanged, and the flanges can be placed into confronting relationship to facilitate bolting the pipes together. This coupling arrangement, however, is not always feasible or available.

A coupling device known as a mechanical joint, or MJ, can be used where one of the pipes does not have an available flanged end. In that situation, the end of the non-flanged pipe is telescopingly received into a flared end of a flanged member, with a following ring or annular gland situated over the pipe adjacent to the flange. A gasket is provided which compresses into the pipe surface and against the flare of the other member to create a water-tight seal as the follower ring is bolted to the flange.

Mechanical joints are suitable for a number of situations, but may not be able to retain the water-tight connection between the pipes where the pipes are subjected to hydraulic thrust forces which might tend to cause the pipes to telescope apart. To reduce the risk of the pipes coming apart, pipe joint restraints have been provided with the MJ or in lieu thereof. A pipe joint restraint typically has an annular retainer gland defining a pipe-receiving space therethrough and having an axial centerline. One or more pockets are associated with the annular retaining gland and have an open end confronting the pipe-receiving space and a top wall radially outwardly of the opening. A gripping element or wedge is movably supported in the pocket and has a gripping edge, such as a tooth, to frictionally engage the pipe surface when the gripping element is moved to project out of the pocket toward a pipe in the pipe-receiving space. The gripping edge resists the tendency of the pipe to move away from the other member when the gland is bolted to the flange of the other member.

Conventionally, the frictional engagement of the wedges to the pipe surface resists separation of the pipe and the joined member. However, reliance on friction as the primary mechanism to hold the pipes together imposes significant requirements on the pipe joint restraint which can be difficult to achieve in the field. By way of example, the gripping element is moved into engagement with the pipe by a threaded bolt in operative engagement with the wedge and the pocket such that as the bolt is rotated, the wedge can be moved into the pipe surface. In order to provide a sufficient hold to the pipe, however, it has been required to tighten the bolt to relatively high torques, typically greater than about 65 to 75 or 90 foot-pounds for ductile iron pipes. These high torques require more effort and exertion by the personnel who install or service the pipes. These difficulties are compounded when personnel must install pipes in the often inhospitable conditions of the outdoors, such as freezing, wet, or muddy conditions, and in the tight spaces often experienced in the field. Moreover, application of such high torques can deflect the pipe, making it difficult to maintain a seal. Often, the axial bolts that secure the gland to the flange on the adjoining member must be re-tightened to maintain a good seal. Moreover, the thrust forces may exceed the frictional ability of the joint to resist separation of the pipe and the joined member.

Because piping systems may be formed from many different materials such as metals (like ductile iron or steel, for example) or polymeric materials such as polyvinyl chloride (PVC) or other plastic materials, and because each of these materials exhibits different properties and characteristics, different types of wedges are required to adapt pipe joint restraints for use with each of the different types of pipes. For example, pipes formed from ductile iron are much harder than pipes formed from polymeric materials, such as PVC. Accordingly, the surface areas contacted by the wedges, as well as the number of wedges and the particular configuration of the gripping edges, may be considerably different depending on the material from which the pipe is formed. In addition, the torque required to sufficiently secure the wedges to the respective types of pipes varies due to the differences in material properties of the pipes. Because pipes are also available in different sizes, further variation in the configuration of the wedges is required to accommodate different sizes of pipe. To accommodate all of these various configurations, manufacturers or suppliers must maintain a considerable inventory of different configurations of wedges and retainer glands, as well as the tooling needed to produce these various configurations. Service and installation personnel might also have to keep on hand several different types of retainer glands and corresponding wedges to be able to work with the many different variations of pipes that may be encountered in the field.

SUMMARY OF THE INVENTION

The present invention provides pipe joint restraints that overcome drawbacks of prior pipe joint restraints such as those described above. In some prior pipe joint restraints, the gripping element could pivot about a fulcrum to provide a biting action to attempt to limit thrust movement of the pipe. However, the fulcrum was defined, for example, at the end of the adjustment bolt, which resulted in a movable fulcrum which in turn led to less than desirable securement to the pipe, and allowed the connection to fail if the bolt was not highly torqued. I have discovered that moving the gripping element toward the axial centerline and relative to a fulcrum that is fixed a predetermined distance from the centerline of the annular gland results in a much more reliable engagement with the pipe, and can achieve a secure connection at much lower torque than previously thought possible, especially where the pipe is metal. To that end, and in accordance with the principles of one aspect of the present invention, the top wall of the pocket defines a fulcrum fixed a predetermined distance from the axial centerline of the annular retainer gland, with the gripping element being operatively engaged therewith so as to move relative to the fulcrum such that the gripping edge moves toward the centerline of the gland in response to movement of the pipe along the axial centerline of the gland. That movement is believed to result in a better engagement with the pipe surface as thrust tends to separate the pipes which in turn can better resist further thrust movement of the pipe than did previous pipe joint restraints.

Advantageously, the gripping element may pivot about the fulcrum. The gripping element may be operatively engaged with the fulcrum via an adjustment member, such as a bolt, which pivots about the fulcrum with the gripping element. When the gripping element is advanced toward the pipe surface by the adjustment member, the gripping element is disposed in a first orientation and grips the pipe by driving a gripping edge into the surface. When the pipes are subsequently exposed to hydraulic forces, the gripping element pivots about the fixed fulcrum to further drive the gripping edge into the surface and thereby resist separation of the pipe from the member to which it is joined.

The bolt may include a shoulder that pivots about the fulcrum. To that end, the top wall may include two planar surfaces extending oblique to each other from a junction, with the fulcrum defined at the junction. Alternatively, the top wall may include two surfaces that define a step therebetween, with the fulcrum being defined by the step. Additionally, or further alternatively, the top wall may include an arcuate surface or a protrusion on which the fulcrum is defined. A plurality of fulcrums may be defined thereon each being fixed a respectively predetermined distance from the axial centerline of the gland.

In another aspect of the invention, a stop is associated with the pocket to limit how far the gripping element can pivot about the fulcrum. The pocket may have an inwardly extending rear wall, with the stop defined thereon. The rear wall may be substantially perpendicular to an axial centerline of the gland (and thus substantially perpendicular to the surface of the pipe), or it may be oblique to the axial centerline of the gland. Advantageously, the gripping element may be pivotable between a first position spaced from the stop and a second position contacting the stop.

It is believed that movement into the pipe, such as by pivoting of the gripping element, about the fixed fulcrum formed in the top wall of the pocket creates an action resulting in a gripping of the pipe which exceeds that attainable by previous pipe joint restraint devices. In accordance with a yet further aspect of the present invention, when a bolt is used as the adjustment member, sufficient engagement between the gripping element and pipe may be achieved even for metal pipes at much lower torques than previously thought reliable, such as 40 to 60 foot-pounds, and advantageously about 45 foot-pounds.

In accordance with a still further aspect of the present invention, it has been determined that the same level of torque may be applied to achieve a reliable grip for both metal or polymeric pipes by appropriate selection of the gripping element. To that end, a gripping element of a first type for use with metal pipe may have a gripping edge of a particular length, whereas a gripping element of a second type for use with polymeric pipe may have a gripping edge that is similar to but is otherwise longer than the gripping edge of the first type. Advantageously, each gripping element has a laterally extending arm (extending in the circumferential direction of the annular retainer gland), with the gripping edge disposed at least in part along the arm. The gripping elements may have different length arms, to thus provide longer or shorter gripping edges, to define the first and second types of gripping elements. For example, the gripping element may have relatively short arms when it is to be used with harder materials such as ductile iron pipes, while relatively longer arms may be used for softer polymeric material pipes, such as PVC pipes. The shorter arms result in a relatively smaller contact surface on the pipe, thereby increasing the stress between the gripping element and the pipe surface. This may be desirable when the pipe is formed from a harder material so that the yield strength of the material can be exceeded to form a ridge or groove within the surface of the pipe. Likewise, longer arms are typically desired when the pipe is formed from relatively soft material, such as PVC or other polymeric materials. These longer arms help to distribute the stress between the gripping element and the pipe surface over a greater area, thereby avoiding excessive deformation of the pipe material. By appropriate selection of the gripping element, it is possible to use the same annular retaining gland for either a metal pipe or a polymeric pipe, to thus reduce inventory requirements. Moreover, in the field, the torque requirements are substantially the same to create the desired grip at a common, predetermined torque, namely about 40 to 60 foot-pounds, and advantageously about 45 foot-pounds, when using the appropriate type of gripping element for the material of the pipe. Particularly with respect to ductile iron pipe, that predetermined torque is significantly less than previously thought necessary, while at the same time not requiring any special differences in installation as between metal or polymeric pipes.

It is desirable to limit the torque that can be applied to the adjustment member to the common, predetermined and reduced level of torques, such as 40 to 60, or advantageously, 45 foot-pounds. To that end, and in accordance with a still further aspect of the present invention, the adjustment member may include a torque receiving portion that separates from the adjustment member when the predetermined torque is achieved. It will be appreciated that there are times when the pipe joint restraint must be removed from the pipe some time after installation. However, with the torque receiving portion gone, loosening of the bolt may allow the parts to fall away from the gland after it is slid off the pipe end. To that end, the bolt may be provided with an interior shoulder inside the pocket and an exterior shoulder outside the pocket which cooperate to retain the gripping element proximate the pocket even without a pipe in the pipe-receiving space. One of the shoulders may also cooperate with the fulcrum of the pocket top wall as described above.

By virtue of the foregoing, there are thus provided pipe joint restraints that overcomes drawbacks of prior pipe joint restraints. These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE DRAWINGS

Figure 1:
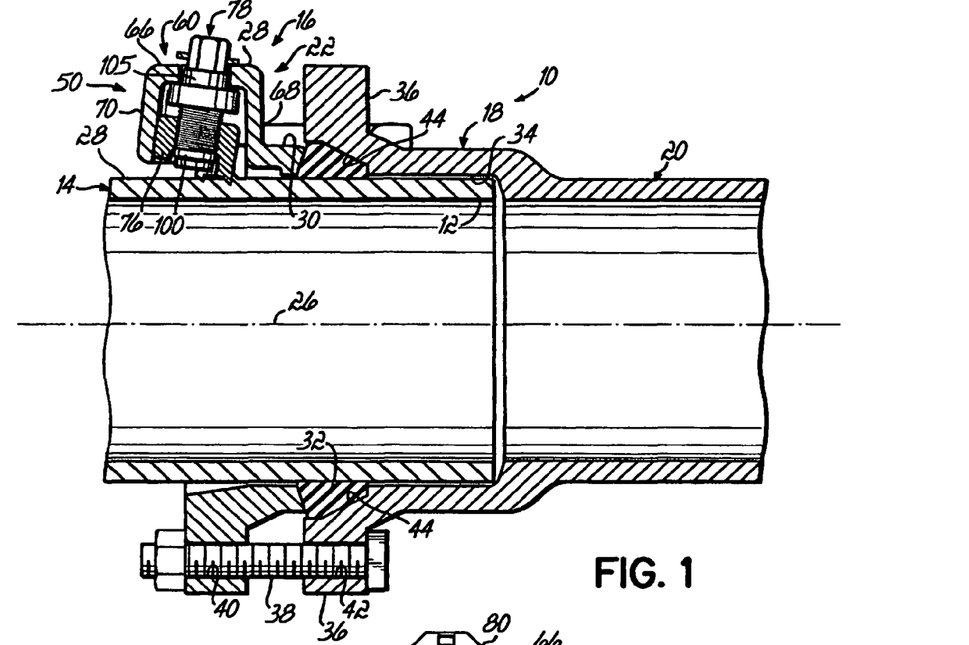
FIG. 1 is a cross-sectional view of a pair of pipes coupled together by a pipe joint restraint in accordance with the present invention.
Figure 2:
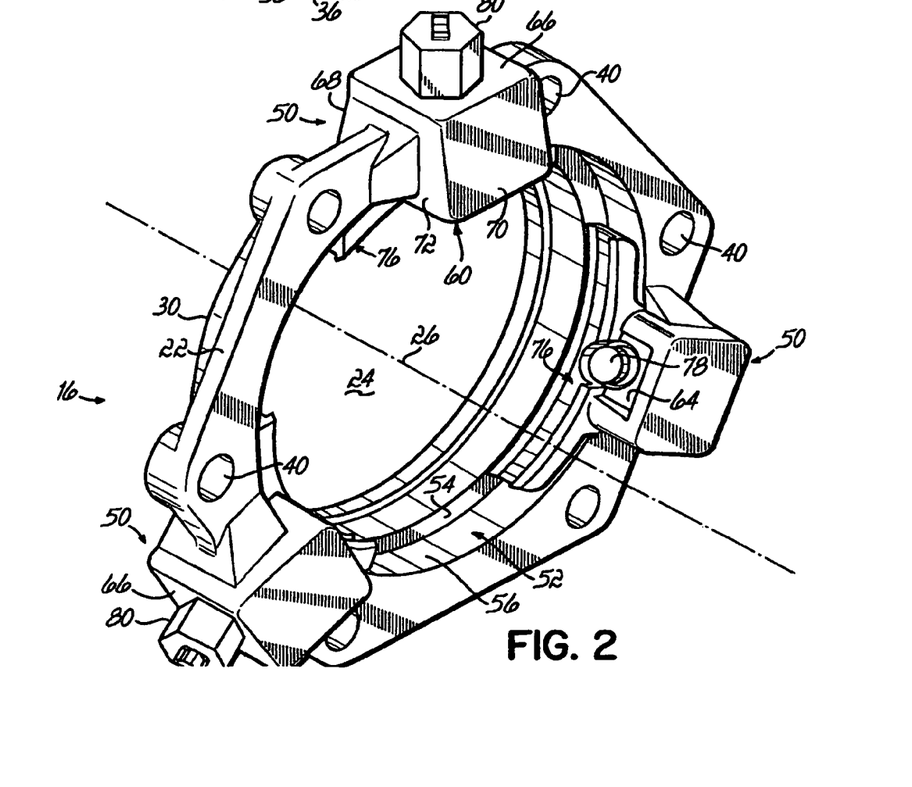
FIG. 2 is a perspective view, from the back, of the pipe joint restraint of FIG. 1.

With reference to FIGS. 1 through 5, there is shown an embodiment of a pipe joint assembly 10 according to the various aspects of the present invention wherein the end 12 of a first pipe 14, such as a water main pipe, is secured by a pipe joint restraint 16 to the end 18 of a second pipe-like member 20 which may, for example, be another water main pipe or a pipe-like extension of a valve, fitting, fire hydrant, or other similar structure. Pipe joint restraint 16 has an annular retainer gland 22 defining a pipe receiving space 24 therethrough and having an axial centerline 26 (FIG. 2). Pipe end 12 is received into space 24 along axial centerline 26 such that gland 22 is disposed on the outer surface 28 of first pipe 14. Gland 22 includes a front projecting rim 30 which butts up against an annular sealing member 32, such as a gasket, received on outer surface 28 of pipe end 12.

The end 18 of second pipe 20 is flared as at 34 to telescopingly receive pipe end 12 therein. A flange 36 of pipe end 18 may be held to gland 22 with T-bolts 38 (only one shown) received through axially-extending holes 40 and 42 on the gland 22 and flange 36, respectively. Gasket 32 is in recess 44 coaxial with the flange 36 sized to receive a portion of rim 30 so as to push gasket 32 into a water-tight sealing relationship with pipe surface 28 and pipe recess 44 as bolts 38 are tightened down.

Annular retainer gland 22 is secured to first pipe 14 by one or more pipe restraining mechanisms 50. Each pipe restraining mechanism 50 is positioned adjacent an annular space 52 extending around the inside circumference of, retainer gland 22. The annular space 52 is defined by a front wall 54 and an adjacent, circumferential axially rearwardly extending top surface 56. It is to be understood that the terms "top", "front", "rear", and "bottom", will be used solely as matters of definition and are selected based on the orientation of the gland 22 and/or mechanism 50. It will be apparent, therefore, that since the retainer gland 22 shown in FIG. 2 includes three of the mechanisms 50, the terms "top", "front", "rear", and "bottom" do not necessarily refer to actual positions in the retainer gland. Rather, bottom is meant to refer to a direction towards the pipe-receiving space 24, and top is radially outwardly thereof as seen in FIG. 2, whereas front refers to the direction towards the end 12 of first pipe 14, i.e., towards second pipe 20, and rear (or back) is in the opposite direction axially spaced away from the front as seen in FIG. 1.

In the exemplary retainer gland 22 shown in FIG. 2, three circumferentially spaced mechanisms 50 are depicted, However, the number of mechanisms 50 may vary as required for a particular application. Because the three mechanisms 50 shown are identical in construction, specific details of only one mechanism 50 will be described. Each pipe restraining mechanism 50 includes a pocket housing 60 (FIG. 3) associated with gland 22 such as by being integrally formed therewith and a pipe engaging assembly 62 (FIG. 5) cooperatively coupled to pocket housing 60. Pocket housing 60 has an open bottom 64 (FIG. 3) confronting pipe-receiving space 24, a top wall 66 radially outwardly of opening 64, front wall 68, rear wall 70 and two sidewalls 72 (only one shown in FIG. 3) to define therebetween a pocket 74. Each pipe engaging assembly 62 (FIG. 5) includes at least a gripping edge 75 supported on a gripping element 76, also referred to as a wedge, an adjustment member 78, which may advantageously be in the form of a rigid, elongated collar bolt (¾ inch diameter—10 UNC threads per inch), and a hollow nut 80 to receive torque to adjust bolt 78. Gripping element 76 is received in pocket 74 defined within pocket housing 60 such that at least a top portion 82 of wedge 76 is moveable within pocket 74. Bolt 78 has a top shank portion 84 extending outside of the pocket 74 and a threaded shank portion 86 extending into and at least partially within pocket 74. Wedge 76 may be inserted into pocket 74 through bottom opening 64 and has a threaded hole 88 extending radially at least partially therethrough to be threadably engaged with threaded portion 86 of bolt 78. As will be appreciated, rotation of bolt 78, such as via nut 80, causes wedge 76 to move radially toward or away from top wall 66 of pocket 74. Wedge 76 has at least one gripping edge or tooth 75 so as to engage pipe surface 28 when wedge 76 is moved toward pipe 14 as seen in FIG. 4A, and to thereafter bite into pipe surface 28 in response to thrust forces tending to move pipe ends 12, 18 telescopingly apart such as along centerline 26 as seen in FIG. 4B. In the embodiment shown in FIG. 5, two teeth 75 are provided.

Figure 3:
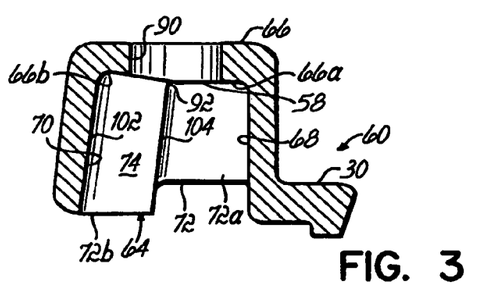
FIG. 3 is a partial cross-sectional view of one embodiment of a gripping element pocket of the retainer gland of FIG. 2.
Figure 4A:
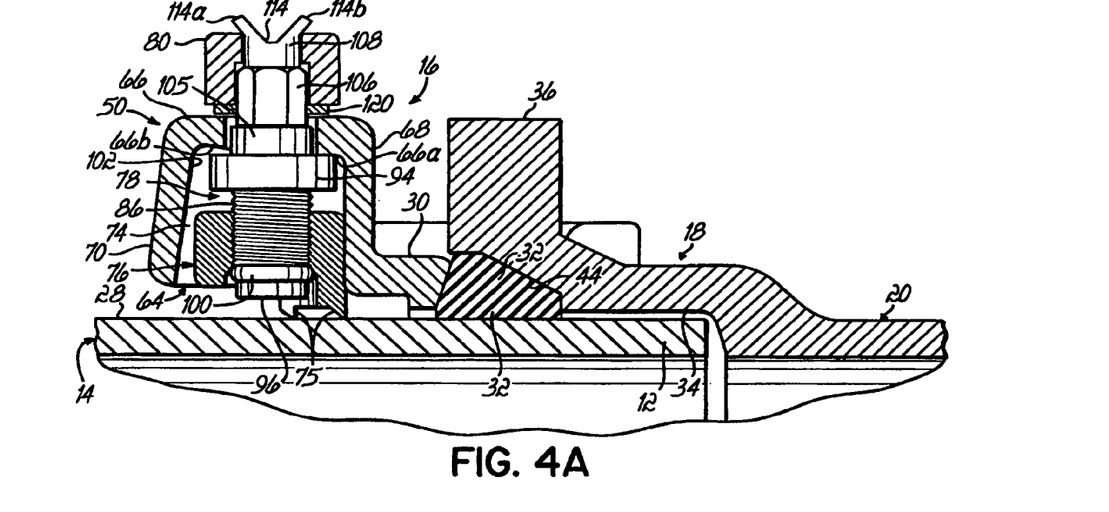
FIGS. 4A and 4B are partial cross-sectional views of the pipe joint restraint and coupled pipes of FIG. 1 for purposes of explaining certain aspects of the present invention.
Figure 4B:
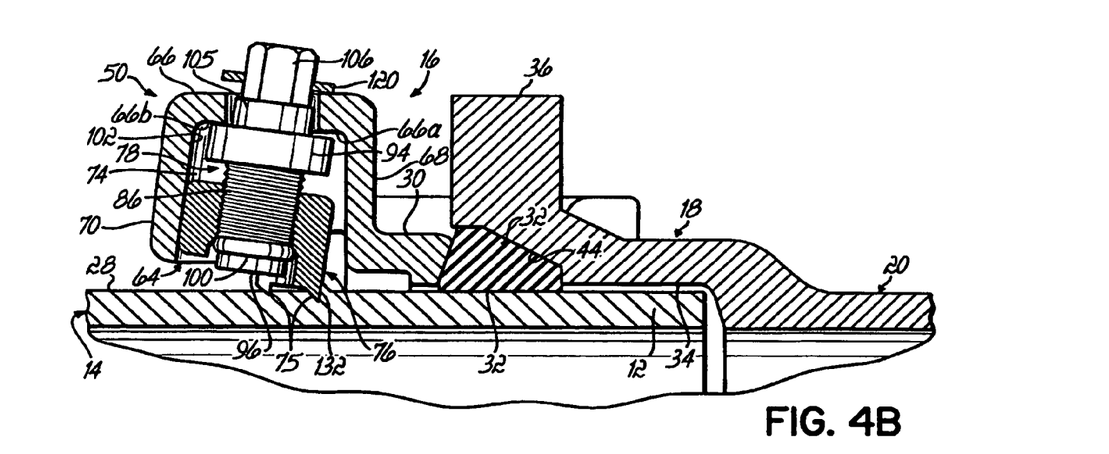

With particular reference to FIG. 3, top wall 66 of pocket 74 contains a non-threaded through-hole 90 with portion 84 of bolt 78 projecting therethrough, a front bearing surface 66a, and a rear bearing surface 66b. The front bearing surface 66a is substantially planar and parallel to the axial centerline 26 of the gland 22 (and, consequently, to the surface 28 of a first pipe 14). The rear bearing surface 66b is also substantially planar but oblique to the front bearing surface 66a so as to be inclined towards the top and back with respect to the axial centerline 26. The front and rear bearing surfaces 66a, 66b intersect at a juncture 92 approximately at the centerline of the through-hole 90, creating a fulcrum thereat (i.e., at 92) at a fixed distance from axial centerline 26 of gland 22 and about which gripping element 76 may move or pivot as will be explained.

Figures 5, 6:
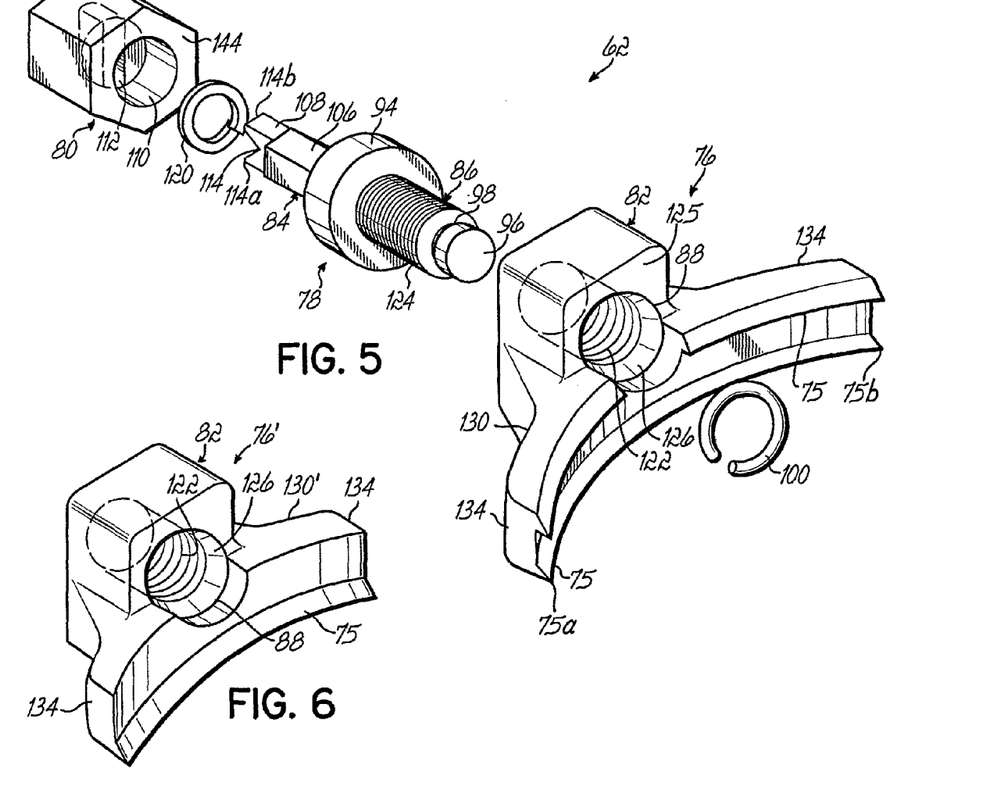
FIG. 5 is an exploded perspective view of a pipe engaging assembly of the pipe joint restraint of FIG. 1 and having a first type of gripping element.
FIG. 6 is a perspective view of a second type of gripping element for use in the pipe engaging assembly of FIG. 5.

With particular reference to FIG. 5, adjustment member bolt 78 has a collar 94 between a non-threaded shank 84 and threaded shank 86 and adapted to be within pocket 74. Collar 94 is larger than hole 90 so as to pivotably bear against top wall 66 without coming out through the top wall 66. The threaded shank 86 may, if desired, terminate in a non-threaded tip 96 of smaller diameter than the minor thread diameter of the threaded shank 86. The non-threaded tip 96 may contain a groove 98 for receiving a retaining snap ring 100 (FIG. 1). The retaining snap ring 100 is wider than the diameter of wedge hole 88 and 50 acts as a limit to travel of the gripping element 76 along the threaded shank 86 toward pipe receiving space 22 to thereby minimize or prevent over deflection of the surface 28 of pipe 14 when moving gripping element 76 into engagement with pipe surface 28 (FIG. 4A). When gripping element 76 and particularly gripping edge(s) 75 thereof, are in contact with pipe surface 28 as seen in FIG. 4A, thrust forces that tend to propel the pipes 14 and 20 apart telescopingly cause pipe end 12 to move towards the rear (in FIG. 1). That tendency to rearward movement causes gripping element 76 to move from a first angular orientation, such as with hole 88 perpendicular to centerline 26 as seen in FIG. 4A, to a second angular orientation with hole 88 oblique to centerline 26 as seen in FIG. 4B such that gripping edge 75 has moved towards centerline 26. In particular, gripping element 76, via bolt 78 and collar 94, is operatively engaged with fulcrum 92 so as to move relative thereto such that the gripping edge 75 moves toward centerline 26 in response to movement of pipe 14 along centerline 26 with gripping element 76 engaged with pipe 14. The gripping element 76 is most advantageously pivotal about fulcrum 92 which is fixed relative to centerline 26 so as to enhance the biting affect of gripping edge 75 to pipe surface 28. As pipe 14 tends to thus move, bolt 78 pivots about fulcrum 92 with gripping element 76 such that collar 94 tilts from bearing contact with surface 66a into bearing contact with surface 66b, to thus pivot gripping element 76 in the direction of movement of pipe 14. That pivot action also serves to restrain further rearward movement of pipe 14 against the encountered thrust forces so as to hold the pipe ends 12, 16 fluidically together.

A stop 102 associated with the pocket 74 limits the rotational movement of the gripping element 76 from the first position (FIG. 4A) spaced from stop 102 to the second position (FIG. 4B) contacting stop 102. In the embodiment shown, stop 102 is defined on, and by, the rear wall 70 of the pocket 74. Alternatively, a stop that limits the rotation of the gripping element may be provided on other portions of the pipe joint restraint 16. In the embodiment shown, the rear wall 70 extends radially inwardly toward the pipe receiving space 24 and axially rearwardly so as to be substantially perpendicular to the rear bearing surface 66b and therefore inclined obliquely to a direction that is perpendicular to the axial centerline 26 of the gland 22.

Each sidewall 72 extends from the top wall 66 toward the open bottom 64, and between the front and rear walls 68, 70. The sidewalls 72 may each comprise first and second sidewall sections 72a, 72b with secondary bearing surfaces 104 positioned therebetween. These secondary bearing surfaces 104 act as secondary stops that further limit pivoting movement of the gripping element 76 toward the second position. The first sidewall sections 72a extend from the front bearing surface 66a and slope away from the front bearing surface 66a outwardly toward the annular space 52.

In the embodiment shown, the non-threaded shank 84 contains a cylindrical portion 105 above shoulder 94 (FIG. 4A) and sized to fit rotatably with hole 90 of top wall 66, a hexagonal secondary driving head 106, and a rectangular cross section primary driving head 108. Secondary driving head 106 fits rotatably within bottom opening 110 of nut 80, and primary head 108 fits snugly within top, rectangular slot 112 of nut 80 such that rotation of nut 80 translates torque through head 108 to rotate bolt 78. Driving head 108 terminates in a V-shaped stake 114 extending beyond the top 115 of hollow nut 80. The legs 114a, 114b of the V-shaped stake 114 may be forced apart during assembly over the top 115 of nut 80 to thereby retain the nut 80 on the non-threaded shank 84, and consequently retain the gripping element 76 and the adjustment member 78 with pocket 74 during shipment and subsequent installation on the pipe 14. While the embodiments shown herein have been depicted with a nut staked to the primary driving head 108, it will be recognized that other methods may be used to secure the nut 80 to the primary driving head 108. Before applying nut 80, a lockwasher 120 may be force-fit over secondary head 106 to serve as an external shoulder for purposes to be described hereafter.

Rectangular cross-section primary driving head 108 is adapted to break or twist off when the torque applied to the collar bolt 78 via nut 80 exceeds a predetermined torque, thus limiting the torque on bolt 78 to about the predetermined amount. In one embodiment, the predetermined torque is not more than about 40 to 60 foot-pounds. In another embodiment, the predetermined torque is not more than about 45 foot-pounds. As a result, the nut 80 serves as a torque receiving portion that separates from bolt 78 to limit tightening of bolt 78 to approximately the predetermined torque.

Lockwasher 120 is external of pocket 74 and remains secured to the adjustment member 78 after hollow nut 80 is separated from bolt 78. The lockwasher 120 thus defines a shoulder exterior of the pocket 74 and cooperates with the collar 94, which defines a shoulder interior of the pocket 74, to retain the bolt 78, and gripping element 76 thereon, proximate the pocket 74 if the retainer gland 22 is subsequently removed from the pipe 14 (which can be achieved by loosening bolt 78 via secondary head 106). While the embodiments shown and described herein include shearable driving head 108 to limit the torque applied to the adjustment member, it will be recognized that various other methods of limiting the applied torque may alternatively be used.

Hole 88 of the gripping element 76 includes internal threads 122 to match the external threads 124 on the threaded shank 86. The internal threaded portion 122 extends radially outwardly partially through the gripping element 76 from above the bottom face 125 thereof with the bottom-most portion defining a non-threaded tapered portion 126 (FIG. 5) that is larger in diameter than the major diameter of the threaded portion 122 and sized to receive therein the retaining snap ring 100. However, as will be appreciated, mechanism 50 is adapted, such as through use of driving head 108, to limit torque such that snap ring 100, and the associated structural variations to bolt 78 and hole 88 to accommodate snap ring 100, may not be necessary.

Positioned radially below bottom face 125 is an arcuate bottom arm 130 supporting the gripping edge(s) 75. Arm 130 is adapted to move toward engagement with pipe surface 28 as edge(s) 75 engages thereat (FIG. 4A). Where pipe 14 is of a polymeric material, the gripping edge(s) 75 and the arm 130 supporting same are relatively long and fit circumferentially into annular space 52 well beyond the perimeter of pocket 74. Where the pipe 14 is of metal, such as ductile iron, the gripping edge(s) 75 can be shorter, and so they may the arms 130 be shorter, as at 130' in FIG. 6, so as to be more closely confined near or within the footprint of pocket 74 at open bottom 64. While two gripping edges 75 are shown in FIG. 5, it will be recognized that gripping element 76 may have only one gripping edge 75, as depicted for gripping element 76' in FIG. 6, or may have three or more such edges. The length of the gripping edges 75 and thus arms 130, 130' may be selected, as required, to accommodate pipes made from different materials.

Relatively longer gripping edges 75 may be desired for use with pipes formed from soft materials, such as PVC or other polymers, so that the contact stresses between the gripping element 76 and the pipe are spread over a wider area, while shorter, but otherwise similar, gripping edges 75 may be desired for use with relatively harder pipes, such as ductile iron or other metals, where the reduced contact area between the gripping edges 75 and the pipe helps to overcome the yield strength of the pipe material so that an adequate bite, such as a deflection of surface 28 and/or formation of a groove in pipe surface 28 as at 132 (FIG. 4B). For pipes 14 nominally referred to by AWWA standards as being 6" to 12" in size, the radial depth of each tooth 75 (which is at a 35° angle) may be about 0.10 inch, or about 0.07 inch for 4" pipe. The tooth 75 is intended generally to conform to the circumference of pipe 14, to define a cord length between the outer tip ends 75a, 75b thereof. The cord length for polymeric pipes may be about 4.40 inches for 6" pipe and 4.50 inches for 8" pipes. For 4" pipes, the cord length may be about 4.30 inches, but the tooth is curved to subtend an angle of 138° of the pipe circumference. For metal pipes, a 2.3 inch cord length may be selected for pipe sizes of 4" to 12" and possibly larger pipes.

In the embodiments shown, the side portions 134 of arms 130 or 130' extending to either side of hole 88 may extend beyond the sidewalls 72 of the pocket 74 and along the annular space 52 to provide secondary bearing areas for contact with sidewall secondary stops 104.

While two embodiments of gripping element 76, 76' are shown herein, it will be recognized that various other configurations of gripping elements may be used with a pipe joint restraint in accordance with the present invention. In any event, selection of the appropriate sized retainer gland 22 and number of mechanisms 50, with selection from at least the two different types of gripping elements 76 or 76' above-described (which differ primarily in the length of edges 75 and/or arms 130, 130' supporting same), facilitates use of the pipe joint restraint 16 with various pipe materials, such as pipes formed from ductile iron, polymeric material, or other materials, merely by such proper selection. The annular gland 22 will be selected to have a pipe receiving space 24 (the ID of gland. 22) matched to the OD of pipe 14. For example, the ID of gland 22 for a 3" pipe is about 4.06 inches and for a 6" pipe is about 7.0 inches so as to accommodate the variations in OD of pipes based on steel or ductile iron standards. However, because the retainer gland 22 has a non-cored annular space 52 which extends circumferentially around the gland, different types of gripping elements having different length arms 130, 130' may be accommodated by the retainer gland 22.

Additionally, and in accordance with another aspect of the invention, pipe restraining mechanism(s) 50 allow operation with either metal or polymeric pipe 14 with a common, predetermined torque being applied to nut 80 sufficient to cause gripping element 76 or 76' to adequately engage the surface 28 of pipe 14, regardless of the material used to form the pipe. In one embodiment, the predetermined torque is not more than approximately 40 to 60 foot-pounds. In another embodiment, the predetermined torque is not more than approximately 45 foot-pounds. This torque value is substantially less than the torque conventionally required for restraining pipes with prior pipe joint restraints, especially where the pipe was of ductile iron. Thus, in the field, no special training or equipment is necessary between polymeric or metal pipes, as the same, or a common, torque is to be applied and the nut 80 breaks away thereat such that selection of the type of gripping element (e.g., 76 or 76') is the primary factor to be decided.

Figure 7A:
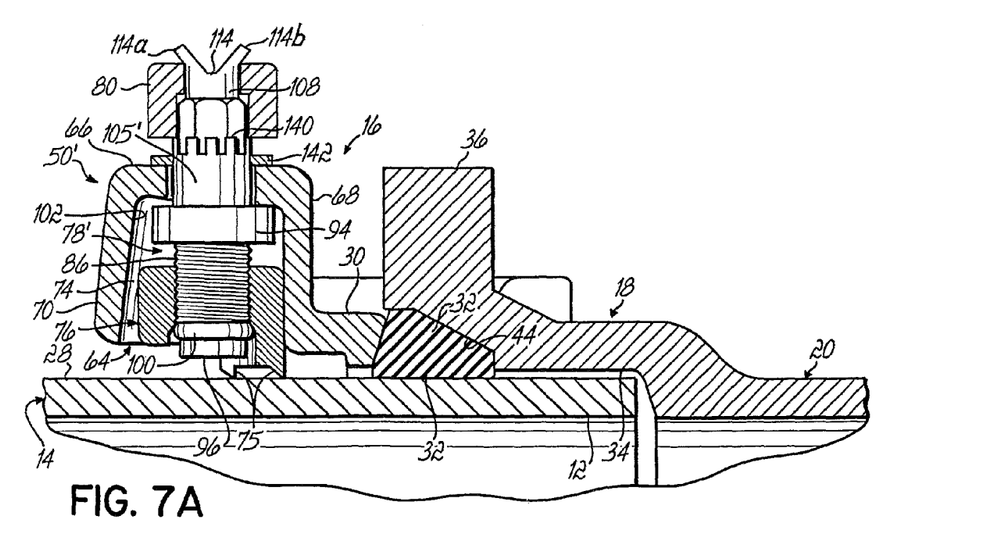
FIGS. 7A-7C are partial cross-sectional views depicting an alternative embodiment of a pipe joint restraint coupling a pair of pipes in accordance with the principles of the present invention.
Figure 7B:
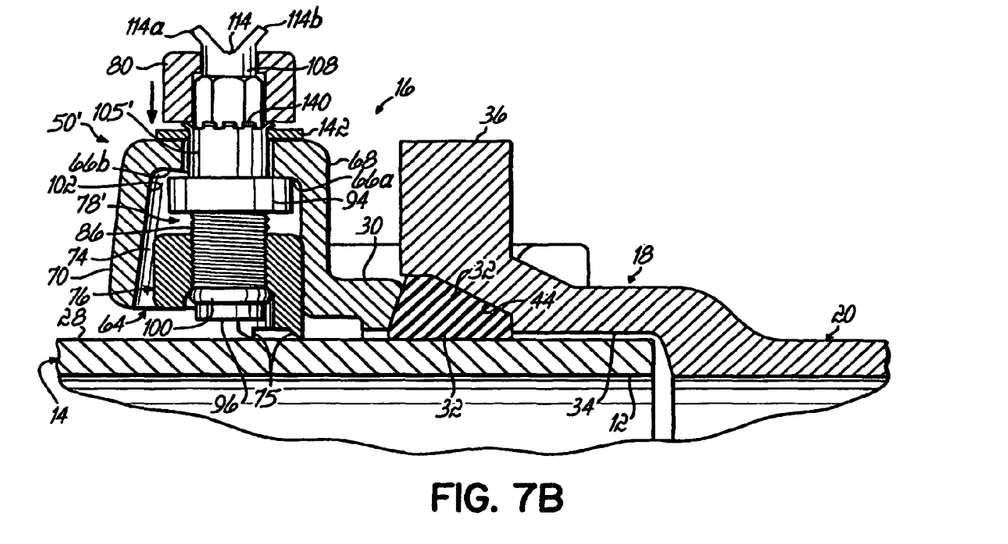
Figure 7C:
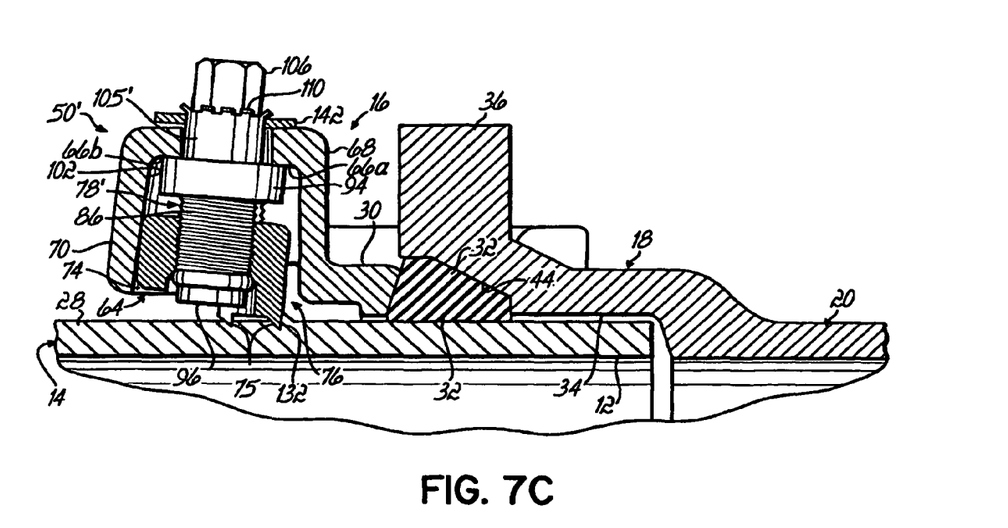

FIGS. 7A-7C, shows a modified version of pipe restraining mechanism 50' where like parts to mechanism 50 bear like numbers. As can be seen, mechanism 50' differs from mechanism 50 primarily in that the cylinder portion 105' of bolt 78' has a castellated rim 140 extending through non-threaded through-hole 90 in the top of pocket 74 and a resilient washer 142 is fitted over the castellated rim 140. Resilient washer 142 serves to retain the adjustment member bolt 78' in a position substantially perpendicular to the axial centerline 26 during installation on the pipe 14. As the hollow nut 80 is pressed down onto the primary driving head 108, the bottom surface 144 of the nut 80 engages the castellated rim 110, deforming and spreading the rim 110 outwardly as seen in FIGS. 7B (before nut 80 is sheared off) and 7C (after nut 80 has been removed). The castellated rim 140 consequently retains the resilient washer 142 as a shoulder of bolt 78' outside of pocket 74 to thus hold gripping element 76 and adjustment member bolt 78' with the pocket 74.

Figure 8A:
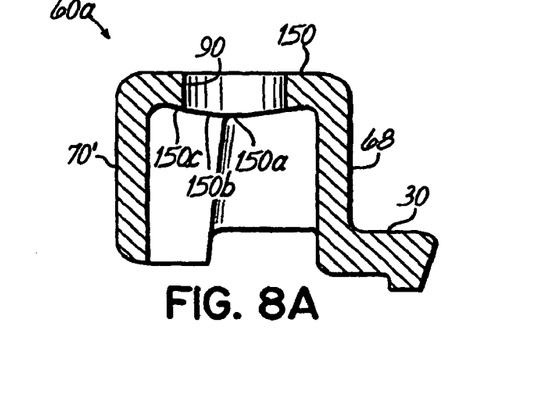
FIGS. 8A-8C are cross sectional views depicting alternative embodiments of gripping element pockets of the retainer gland of FIG. 2.
Figure 8B:
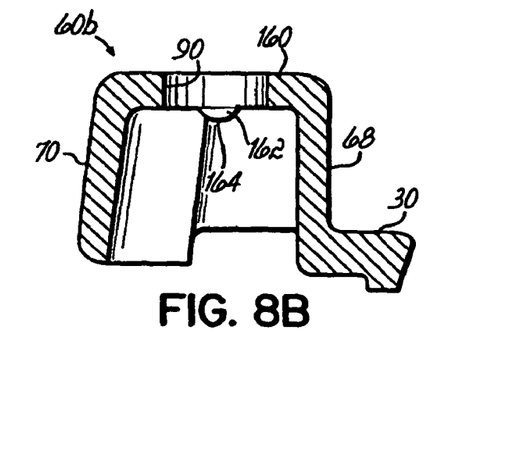
Figure 8C:
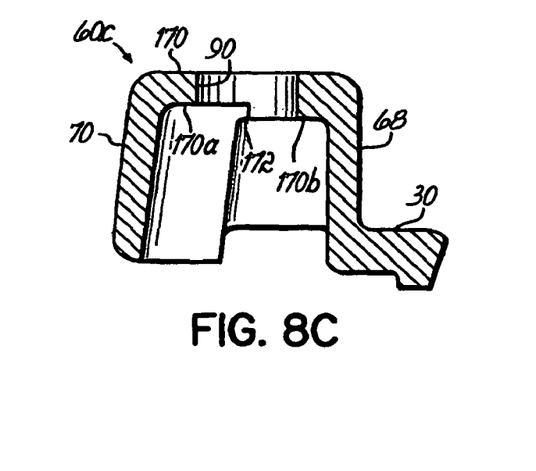

Referring now to FIGS. 8A-8C, there are shown alternative wedge pocket embodiments in accordance with certain aspects of the invention. In FIG. 8A, the wedge pocket 60a is depicted with a top wall 150 having a convex surface which defines plurality of fulcrum positions (only three shown at 150a, 150b, and 150c) each being a respective fixed distance from centerline 26 and about which the adjustment member 78 and gripping element 76 are sequentially pivoted in response to thrust forces, as described above. Depending on the radius of curvature of the convex surface, there may be only one fulcrum 150a, or there may be a plurality of fulcrums (150a, 150b, 150c), each a respective fixed distance from the centerline 26 of retainer gland 22. As a further alternative, rear wall 70' is substantially perpendicular to the centerline 26 of the retainer gland 22 rather than oblique thereto. FIG. 8B depicts another embodiment 60b wherein the top wall 160 includes a bump or ridge 162 to define at least at the bottom apex 164 thereof, the fixed fulcrum of the pocket 60b. In use, the shoulder 94 of the adjustment member 78 abuts the ridge 162 and pivots about the apex fulcrum 164 in reaction to thrust forces developed in the pipe, as described above. FIG. 8C depicts yet another embodiment 60c wherein the top wall 170 comprises two surfaces 170a, 170b having a step 172 formed therebetween. The step 172 defines the fixed fulcrum and about which gripping element 76 pivots in a manner similar to that described above.

With the present invention, pockets 74 may be the same whether two or more mechanisms 50 are to be formed with gland 22 and irrespective of the sizing of gland 22 such that the same core design can be used. With a particular size gland 22 for a selected pipe size, the same number of mechanisms 50 may be used for metal or polymeric pipe by selection of the type of gripping element so as to have the desired length of gripping edge 75. For example, in the 3" to 6" size of pipe, only one gripping element 76, 76' may need to be used for every two bolts 38 required for the standardized MJ. For larger pipe sizes, three mechanisms 50 will usually suffice although four or more may be desired for the largest pipe sizes. The gland 22 may be provided with gripping elements 76 and/or 76' for plastic and/or metal pipes, such that gland 22 is a multiple use gland by providing different types of gripping elements.

In use, gland 22 is placed on surface 28 at the end 12 of pipe 14, and gasket 44 is fitted over pipe end 12. End 12 is telescoped into pipe end 14, and gland 22 bolted to flange 36. Nut(s) 80 is rotated to bring teeth 75 into engagement with surface 28 and may be tightened until it shears off at about the predetermined torque. Pipes 14, 20 may then be pressurized with subsequent hydraulic thrust forces which tend to move pipe 14 along centerline 26 acting to pivot gripping elements 76 to cause teeth 75 to move into and bite into surface 28 to thus resist such movement.

By virtue of the foregoing, there are thus provided pipe joint restraints that overcome drawbacks of prior pipe joint restraints.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A method of securing a pipe, comprising:
   fitting an annular retainer gland carrying a gripping element over the outer surface of the pipe;

moving the gripping element into engagement with the outer surface of the pipe; and pivoting the gripping element about a fulcrum defined on the retainer gland a fixed distance from an axial center of the retainer gland.

2. The method of claim 1, wherein moving the gripping element includes manipulating an adjustment member coupled to the gripping element.

3. The method of claim 2, further comprising tightening the adjustment member to a predetermined torque.

4. The method of claim 3, wherein the predetermined torque is not more than approximately 40 foot-pounds to approximately 60 foot-pounds.

5. The method of claim 3, wherein the predetermined torque is not more than approximately 45 foot-pounds.

6. The method of claim 3 further comprising breaking off a portion of the adjustment member when the adjustment member has been tightened to approximately the predetermined torque.

7. The method of claim 3, wherein the gripping element is one of a first type of gripping element configured for use with metal pipes or a second type of gripping element configured for use with polymeric pipes; and wherein the predetermined torque is the same for both the first and second types of gripping elements.

8. A method of securing a pipe, comprising:

fitting an annular retainer gland carrying a gripping element over the outer surface of the pipe, wherein the annular retainer gland comprises:

a plurality of pockets, each pocket having an opening confronting the pipe and a top wall radially outwardly of the opening, each top wall comprising a front bearing surface and a rear bearing surface oblique to the front bearing surface that define a fulcrum;

a plurality of gripping elements, each gripping element having a gripping edge adapted to engage the outer surface of the pipe; and a plurality of adjustment members, each extending within a respective pocket and threadably coupled to a respective gripping element, each adjustment member operable to move a respective gripping element into engagement with the outer surface of the pipe, and wherein each adjustment member is pivotable about a respective fulcrum;

moving the gripping elements into engagement with the outer surface of the pipe; and pivoting the gripping elements about the respective fulcrums.

9. A method of securing a pipe, comprising:

fitting an annular retainer gland carrying a gripping element over the outer surface of the pipe, wherein the annular retainer gland comprises:

an annular space defined by a wall and an adjacent, circumferential axially extending surface, wherein the circumferential axially extending surface terminates at a radially innermost edge of an outer face of the gland;

a plurality of pockets, each pocket having an opening confronting the pipe;

a plurality of gripping elements, each gripping element associated with a respective one of the pockets, each gripping element comprising an arcuate arm positioned within the annular space and extending circumferentially beyond a respective pocket, each gripping element comprising a gripping edge adapted to engage the outer surface of the pipe;

moving the gripping elements into engagement with the outer surface of the pipe; and pivoting the gripping elements about the respective fulcrums.

10. The method of claim 9, wherein each gripping element being one of a first type or a second type, the first type having a gripping edge with a first length and configured for use with a metal pipe, the second type having a gripping edge with a second length longer than the first length and configured for use with a polymeric pipe.

11. The method of claim 9, wherein the annular retainer gland further comprises a plurality of adjustment members, each operatively engaging a respective gripping element, wherein each adjustment member includes a torque receiving portion that separates from the adjustment member to limit tightening of the adjustment member to a predetermined torque.

12. The method of claim 11, wherein the predetermined torque is not more than approximately 60 foot-pounds.

13. The method of claim 11, wherein the predetermined torque is not more than approximately 45 foot-pounds.

14. The method of claim 11, wherein the predetermined torque is not more than approximately 40 foot-pounds.

* * * * *